(12) United States Patent
Lietzke et al.

(10) Patent No.: US 9,816,863 B1
(45) Date of Patent: Nov. 14, 2017

(54) WIND FIELD VERTICAL PROFILE ESTIMATION USING SPECTRAL RADIANCE OF MULTIBAND IMAGERY AND TEMPERATURE PROFILES

(71) Applicant: Exelis Inc., McLean, VA (US)

(72) Inventors: Christopher E Lietzke, Fort Wayne, IN (US); Ronald J Glumb, Fort Wayne, IN (US)

(73) Assignee: Harris Corporation, Melbourne, FL (US)

( * ) Notice: Subject to any disclaimer, the term of this patent is extended or adjusted under 35 U.S.C. 154(b) by 616 days.

(21) Appl. No.: 14/497,996

(22) Filed: Sep. 26, 2014

(51) Int. Cl.
| | |
|---|---|
| *G01W 1/10* | (2006.01) |
| *G01J 5/00* | (2006.01) |
| *G01J 5/50* | (2006.01) |
| *G01B 11/06* | (2006.01) |
| *G01C 11/06* | (2006.01) |

(52) U.S. Cl.
CPC .......... *G01J 5/007* (2013.01); *G01B 11/0608* (2013.01); *G01C 11/06* (2013.01); *G01J 5/505* (2013.01); *G01W 1/10* (2013.01)

(58) Field of Classification Search
CPC    G01J 5/007; G01J 5/505; G01W 1/10; G01C 11/06; G01B 11/0608
See application file for complete search history.

(56) References Cited

U.S. PATENT DOCUMENTS

| | | | | |
|---|---|---|---|---|
| 8,818,029 B1* | 8/2014 | Mecikalski | ............. | G01W 1/10 382/103 |
| 2009/0074297 A1* | 3/2009 | Robinson | ............. | G06K 9/0057 382/191 |
| 2012/0095946 A1* | 4/2012 | Hansen | ................... | G01W 1/10 706/45 |
| 2013/0314694 A1* | 11/2013 | Tchoryk, Jr. | ............ | G01S 17/95 356/28.5 |
| 2014/0201667 A1* | 7/2014 | Schoeberl | ........... | G06F 3/04842 715/771 |

(Continued)

OTHER PUBLICATIONS

Stic search report, Mar. 22, 2017.*

(Continued)

*Primary Examiner* — John Breene
*Assistant Examiner* — Mohammad Islam
(74) *Attorney, Agent, or Firm* — Edell, Shapiro & Finnan LLC

(57) ABSTRACT

Techniques are provided for an image processing device to receive image information comprising image data for a plurality of mid-wave infrared region (MWIR) channels, where the image data is obtained during a first imaging period and during a second imaging period temporally different from the first imaging period. A plurality of sets of atmospheric wind vectors are calculated using differences between image data obtained during the first imaging period and the image data obtained during the second imaging period for corresponding sets of MWIR channels. An altitude is assigned to the plurality of atmospheric wind vectors in each set based on a brightness temperature of each wind vector and a pre-computed atmospheric temperature profile to generate a set of two-dimensional wind fields comprising one two-dimensional wind field for each set of MWIR channels.

16 Claims, 8 Drawing Sheets

(56) References Cited

U.S. PATENT DOCUMENTS

2015/0019185 A1* 1/2015 Cunningham ...... G06F 17/5009
      703/6
2015/0233962 A1* 8/2015 Tchoryk ................... G01P 5/26
      356/28.5

OTHER PUBLICATIONS

Key, J.R., et al., "Cloud-Drift and Water Vapor Winds in the Polar Regions From MODIS," IEEE Transactions on Geoscience and Remote Sensing, vol. 41, No. 2, pp. 482-492 (Feb. 2003).

Nieman, S.J., et al., "Fully Automated Cloud-Drift Winds in NESDIS Operations," Bulletin of the American Meteorological Society, vol. 78, No. 6, pp. 1121-1133 (Jun. 1997).

Stewart, L., "Derivation of AMVs from Single-Level Retrieved MTG-IRS Moisture Fields," 2012 EUMETSAT Meteorological Satellite Conference, pp. 1-10 (Sep. 2012).

* cited by examiner

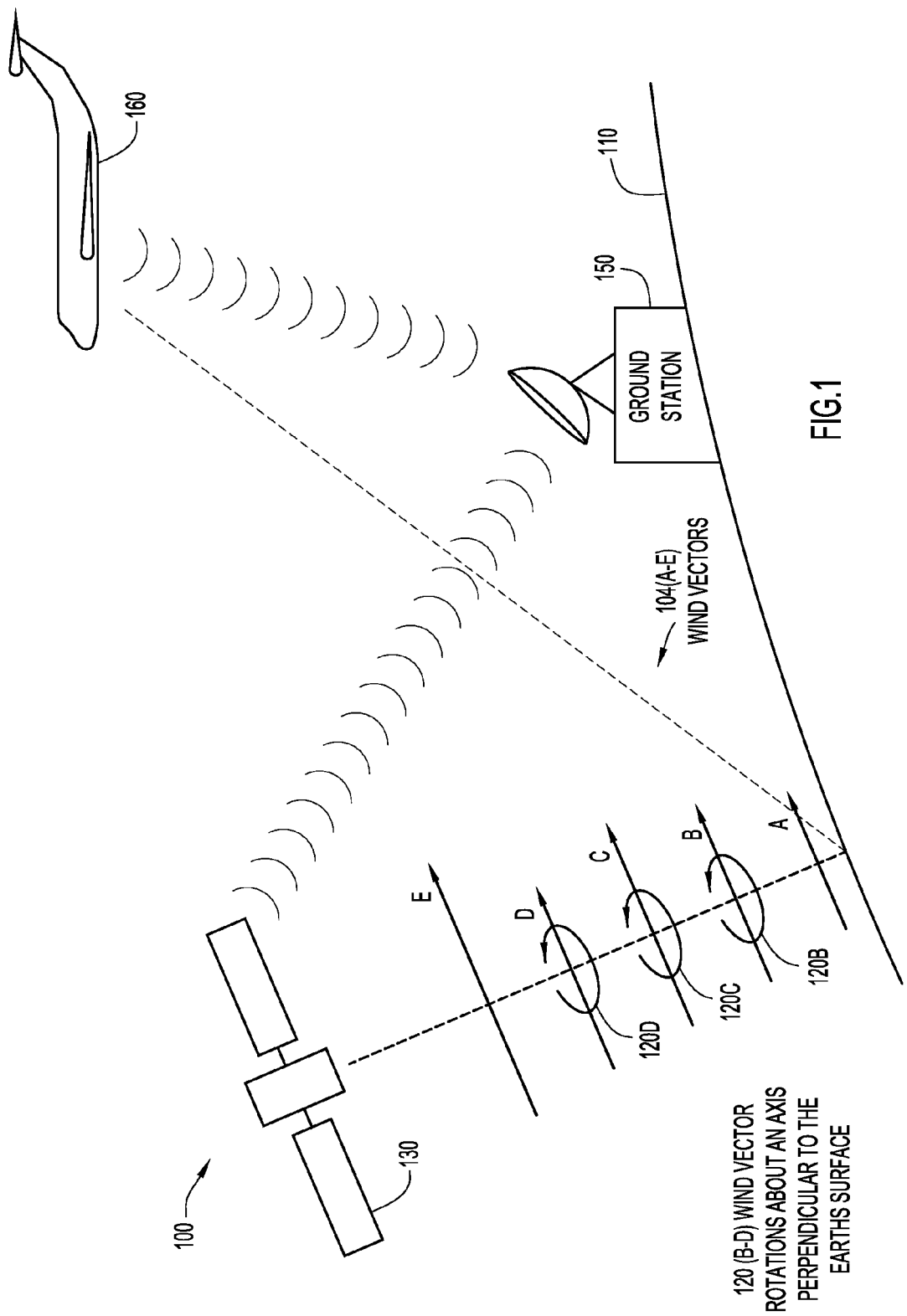

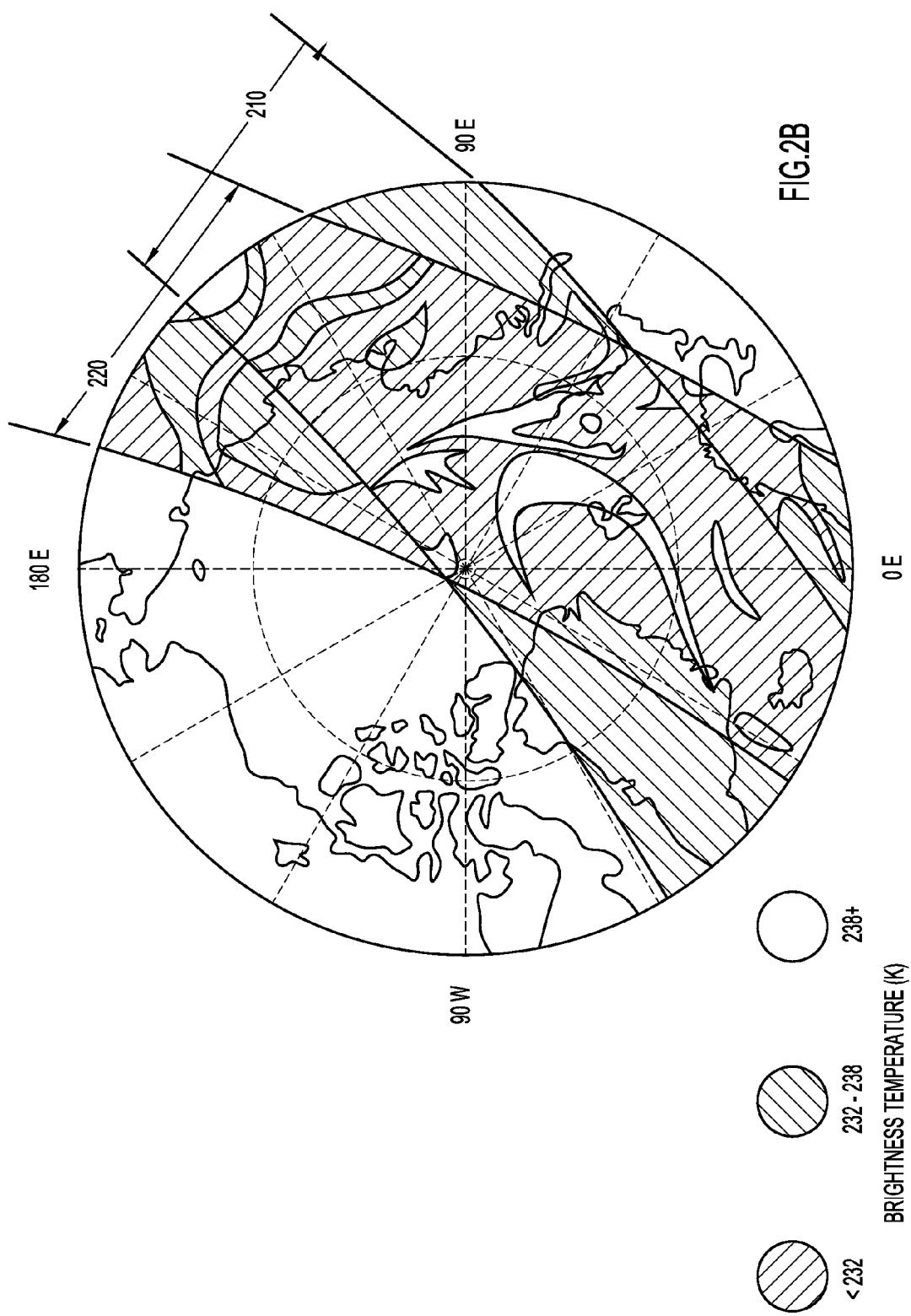

WIND FIELD VERTICAL PROFILE ESTIMATION USING SPECTRAL RADIANCE OF MULTIBAND IMAGERY AND TEMPERATURE PROFILES

BACKGROUND

Satellite based digital imaging devices generally utilize an array of sensors that operate in visible, near visible or other spectrum to capture the digital image information. The sensors may have spectral sensitivities that correspond roughly to various portions of a given spectrum. Data from space-based non-hyperspectral instruments are unable to resolve the vertical structure of the Earth's atmospheric moisture field due to their broad band radiance observations. In this regard, imager-based wind estimation products are limited to the vertical structure of cloud tops and upper tropospheric water vapor distributions present at the time of observation. As a result, these wind estimation products usually are limited to estimating three layers of the troposphere and are spatially discontinuous.

For example, wind field estimation using visible/infrared satellite imagers like Geostationary Operational Environmental Satellite system (GOES), Advanced Very High Resolution Radiometer (AVHRR), and Moderate Resolution Imaging Spectroradiometer (MODIS) are well documented. By way of example, the latest AVHRR satellite has six relatively broad channels including wavelengths ($\lambda$) in a first thermal band at 12 micrometers ($\mu$m), a second thermal band at 11 $\mu$m, a band centered at 3.5 $\mu$m, a band centered at 1.6 $\mu$m, a band in the near infrared centered at 0.9 $\mu$m, and a band in the red region centered at 0.6 $\mu$m. Thus, by their nature, these six channels are unable to resolve the vertical structure of the moisture field due to their broadband spectrum.

In light of the shortcomings of these and other techniques, the need has been felt for a technique to perform atmospheric wind field vertical profile estimation using spectral radiance of multiband imagery and temperature profiles.

SUMMARY

Described herein is a technique to overcome the above described issues. For example, investigations using simulated hyperspectral data have shown the ability to resolve the vertical structure of the wind field using retrievals of water vapor profiles but these are potentially limited by the smoothing of the retrieval algorithm as well as 'holes' in the retrieved fields due to clouds or quality issues. In general, the techniques described herein relate to numerical weather prediction (NWP) which uses numerical models to simulate weather patterns for weather prediction. Ultimately, a three-dimensional (3D) wind field product is produced that provides winds at altitudes from the Earth's surface to the troposphere over an imaged geographic area. Numerous advantages arise from weather prediction, including predicting flight profiles and scheduling, rocket launch windows, or predicting natural disasters (e.g., when flooding, hurricanes, tornados, etc., may occur).

The techniques described herein provide for an image processing device with a receiver configured to image information comprising image data for a plurality of midwave infrared region (MWIR) channels, where the image data is obtained during a first imaging period and during a second imaging period temporally different from the first imaging period. A plurality of sets of atmospheric wind vectors are calculated using differences between image data obtained during the first imaging period and the image data obtained during the second imaging period for corresponding sets of MWIR channels. An altitude is assigned to the plurality of atmospheric wind vectors in each set based on a brightness temperature of each wind vector and a pre-computed atmospheric temperature profile to generate a set of two-dimensional wind fields comprising one two-dimensional wind field for each set of MWIR channels. The plural two-dimensional wind fields form a 3D wind field product.

The image processing device includes a processor with computer logic encoded therein for execution by the processor comprising processing modules that include an image preprocessing module configured to calculate a plurality of atmospheric wind vectors using differences between image data obtained during the first imaging period and image data obtained during the second imaging period for sets of MWIR channels; a height assignment module configured to assign an altitude to each of the plurality of atmospheric wind vectors based on a brightness temperature of each wind vector and a pre-computed atmospheric temperature profile to generate a set of two-dimensional wind fields comprising one two-dimensional wind field for each set of MWIR channels; and a quality control module configured to apply temporal constraints to the set of two-dimensional wind fields using a previously generated set of two-dimensional wind fields to produce a three-dimensional wind field product. The image data may be obtained from, e.g., an imaging device aboard a satellite, aircraft or other vehicle to generate remotely sensed images, where the imaging device is capable of generating hyperspectral imaging data.

The above and still further features and advantages of the present inventive concept will become apparent upon consideration of the following definitions, descriptions and descriptive figures of specific embodiments thereof. While these descriptions go into specific details of certain embodiments of the inventive concept, it is to be understood that variations may and do exist and will be apparent to those skilled in the art upon review of this disclosure.

BRIEF DESCRIPTION OF THE DRAWINGS

FIG. 1 generally illustrates an Earth and space based environment in which remote imaging devices generate image information in accordance with an embodiment of the invention.

FIG. 2B is a decimated version of screen shot of digitally merged two dimensional (2D) imagery obtained from three orbits of a satellite, the satellite being configured to generate atmospheric hyperspectral data in accordance with an embodiment of the invention.

DETAILED DESCRIPTION

Figure 2A:
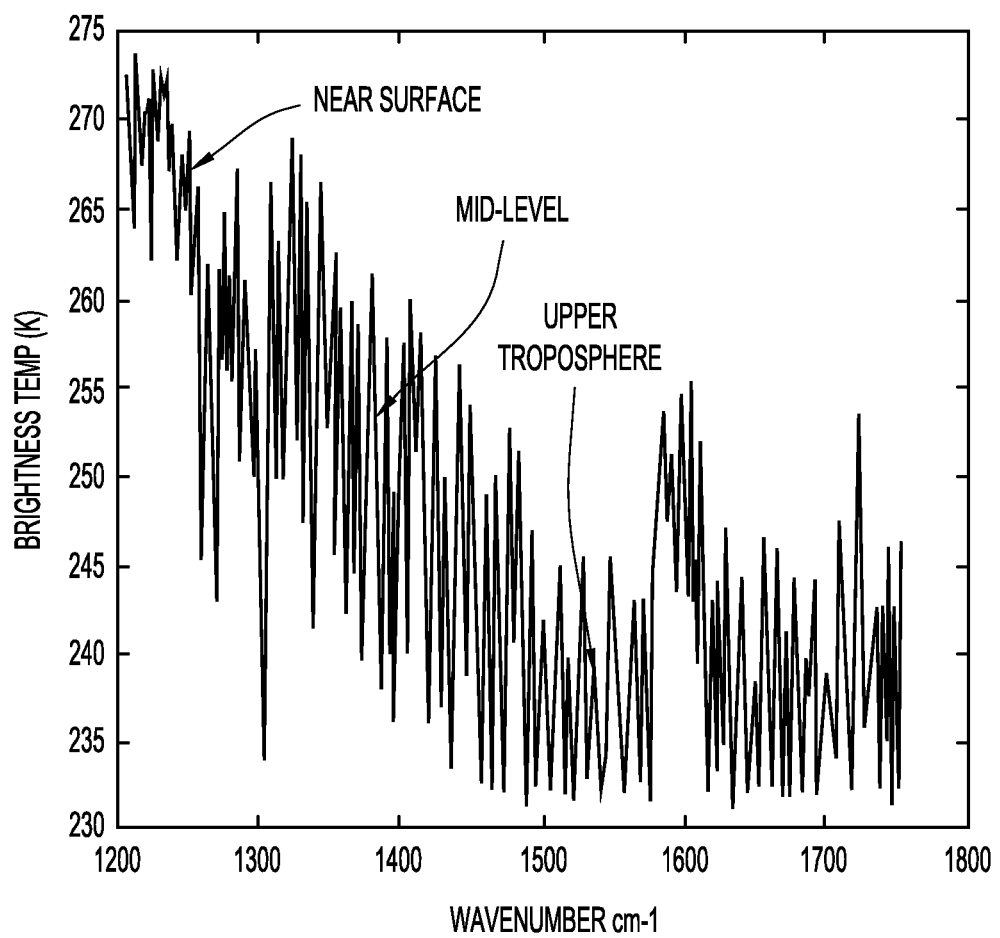
FIG. 2A is a graph illustrating example spectral temperature profile for a Crosstrack Infrared Sounder (CrIS) that indicates an atmospheric temperature at a given altitude in relation to wavelength.

Described herein are techniques for an image processing device to receive image information comprising image data for a plurality of spectral bands in the MWIR spectral region, where the image data are used for hyperspectral analysis of winds in the Earth's atmosphere.

To demonstrate the capability of satellite based hyperspectral sounders to estimate the vertical structure of the wind field, techniques are described herein that leverage the imagery based methods used for imaging sensors while preserving all of the vertical and horizontal information of the remotely sensed moisture field. The inventive concepts described herein use hyperspectral radiances directly to estimate the horizontal wind field while the height of the estimated wind vectors is assigned using the radiance observations along with temperature profiles from spatially and temporally coincident numerical weather prediction fields.

Briefly, the techniques described herein are made with respect to the Crosstrack Infrared Sounder (CrIS) developed as part of the National Polar-orbiting Operational Environmental Satellite System (NPOESS). The CrIS NPOESS mission is to retrieve temperature, moisture and pressure profiles of the earth atmosphere. The components of the satellite include the CrIS as part of the mission package referred to as the Cross-track Infrared/Microwave Sounding Suite (CrIMSS). In general, the satellite occupies an 833 kilometer (km) polar orbit with a 98.7 degree inclination. This particular orbit has a period of approximately 101 minutes.

The CrIS measures upwelling IR radiance by way of 1305 spectral channels with wavelengths ($\lambda$) from 3.9 micrometers ($\mu$m) to 15.4 ($\mu$m). Of those 1305 channels, each covering a slice of the IR spectrum, the techniques described herein are made with respect to 437 channels designed for the mid-wave IR (MWIR) range with wavenumbers from 1210-1750 inverse centimeters $(cm)^{-1}$. The term "channel" generally refers to a specific frequency band or spectral sensitivity band, and in this regard, the 437 MWIR channels correspond to frequencies that can measure relative moisture. The sensor generates thousands of interferograms per day with 30 measured interferograms collected during each cross-track scan (e.g., with an eight second period and corresponding Earth scene Fields of Regard (FOR) and calibrations). The CrIS data is processed by a ground segment that executes most of the computationally intensive signal and other processing.

For example, Sensor Data Record (SDR) algorithms may transform CrIS interferograms into fully calibrated and geolocated spectra, while Environmental Data Record (EDR) algorithms transform the SDR's spectra into temperature, pressure and moisture profiles. Although the signal processing may be performed on the ground, depending on satellite capabilities more processing may be performed by way of the satellite based on the tradeoffs between data transmission rates and processing constraints either in space or on the ground. The techniques described herein need not be limited to the CrIMSS satellite configuration and other sensors may be employed, e.g., aircraft.

Referring to the figures, FIG. 1 illustrates an Earth and space based environment 100 in which a satellite imaging device process images in accordance with an embodiment of the invention. Environment 100 illustrates the Earth's surface 110, as well as the atmosphere up to a given altitude, as described hereinafter, a satellite 130 and/or remote sensor 160 (e.g., an unmanned aerial vehicle (UAV) or reconnaissance aircraft). The satellite 130 is provisioned with imaging equipment and optionally with image processing equipment. In this regard, the satellite 130 images the Earth's atmosphere. Imaging data obtained by satellite 130 and/or sensor 160 may be transmitted to ground station 150.

In the atmosphere, the wind speed and direction (velocity) vary with altitude as indicated by the various lengths of the wind vectors 140A-140E. Furthermore, although the wind vectors are shown from right-to-left, the vectors 140 may rotate with respect to each other as indicated by reference numerals 120B-120D, e.g., by way of the coriolis effect of the Earth's rotation, the jet stream or other atmospheric effects. Thus, the entire wind profile between any given altitude and any given area, e.g., with respect to a given Earth surface area, are referred to herein as a wind field or wind vector field.

To facilitate wind or other atmospheric prediction, radiative transfer models (RTMs) are employed to calculate, e.g., by way of simulation, the propagation of radiation through the Earth's atmosphere for a given atmospheric layer. The techniques described herein, may use a well known RTM, such as the Line-by-Line Radiative Transfer Model (LBL-RTM), which may be used to aide in the height assignment of the wind vector field estimation on a layer by layer basis, e.g., at 500 meter altitude increments.

An example of a CrIS observed spectra for the MWIR 437 channels, mentioned above, with wavenumbers from 1210-1750 inverse centimeters $(cm)^{-1}$ is shown in FIG. 2A. The imagery for one of the 437 moisture sensing channels over the North Pole is shown in FIG. 2B. In this example, the 437 channels viewed in FIG. 2A indicate the brightness or apparent temperature at the received wavenumbers in Kelvin (K) as depicted on the ordinate, with wavenumber depicted on the abscissa. In general, the apparent temperature is higher near the surface and decreases with increasing altitude as shown with respect to the "near surface," "mid-level" and the "upper troposphere." At some point, there is a discontinuity with respect to the tropopause (~36,000 feet) at approximately 1600 $(cm)^{-1}$, above which temperatures are somewhat constant with respect to the altitudes of interest. Accordingly, the strata provided by the measurement across the 437 channels of the MWIR spectrum provide a temperature profile from near the surface of the Earth to altitudes of approximately 50,000 feet (15,000 meters).

It should be noted that as the satellite or other remote sensor (e.g., a high altitude reconnaissance plane or suborbital sensor) makes MWIR signal intensity measurements, only those measurements that spatially overlap are used to estimate the wind field. Thus, as shown in FIG. 2B, two satellite passes for the CrIS (with the 101 minute orbit) over the North Pole have been digitally merged and the intersections of the two satellite passes from one pass to the other are highlighted using various hashings and blank space. In this example, right hashing (e.g., as indicated by the diagonal lines beginning on the upper and left, and terminating on the lower right) is used to indicate temperatures less than 232K, left hashing (as indicated by the diagonal lines beginning on the upper and right, and terminating on the lower left) is used to indicate temperatures of 232-238K, and blank space is used to indicate temperatures greater than 238K. The temperatures depicted in FIG. 2B represent a gross simplification (decimation) of the temperature data. In reality, the temperatures may form continuum from approximately 226-

240K that, in general, can only be appreciated by way of a graduated color pixelated image, where temperature is ranged across the visible spectrum (e.g., from red to violet).

The various temperature regions shown in FIG. 2B represent brightness temperature variation for a single channel from among the 437 MWIR channels monitored, e.g., by the remote satellite 130. In this example, the two satellite passes over the Earth are shown to illustrate the spatial overlap (coincidence) of sequential polar swaths as indicated by reference numerals 210 and 220. The intensity of a given channel's radiation inversely correlates with the moisture content, i.e., a higher the radiance value indicates a lower moisture level in the troposphere where the temperature decreases with altitude.

Within any given channel, the intensity of the measured radiation for given measurement positions will change over time in 2D. As long as the change in radiative intensity (i.e., the change in moisture content) for a given measured area or sub-image is observable with respect to the change in position ($\Delta x/\Delta y$ or $\Delta$ latitude/$\Delta$ longitude) of the measured sub-image (i.e., a position change of the sub-image observed features due to the advection of the moisture features), the positions of the observed features can be tracked. That is, the relative movement of a given sub-image feature can be measured over time (i.e., to generate 2D vectors for that channel) as long as the radiance for those sub-image features can be correlated from one measurement period to the next.

Wind direction vectors can be generated from channel measurements obtained from one orbit to the next to generate wind vectors at the channel's corresponding altitude, as further described below. Plural 2D measurements for a given channel's response can be combined across the 437 channels sorting their response based upon their corresponding altitude sensitivity to generate a 3D wind vector field product (i.e. a plurality of vertical layers of 2D wind fields, meaning no vertical component of the wind is determined). The 3D wind vector field product will change from pass to pass due to the wind shear generated in both the vertical and horizontal planes, as well as the moisture content that changes due to convective (thermals) or other atmospheric effects (e.g., rain, snow, clouds, sunshine, jet stream, high/low pressure systems, etc.).

Figure 3:
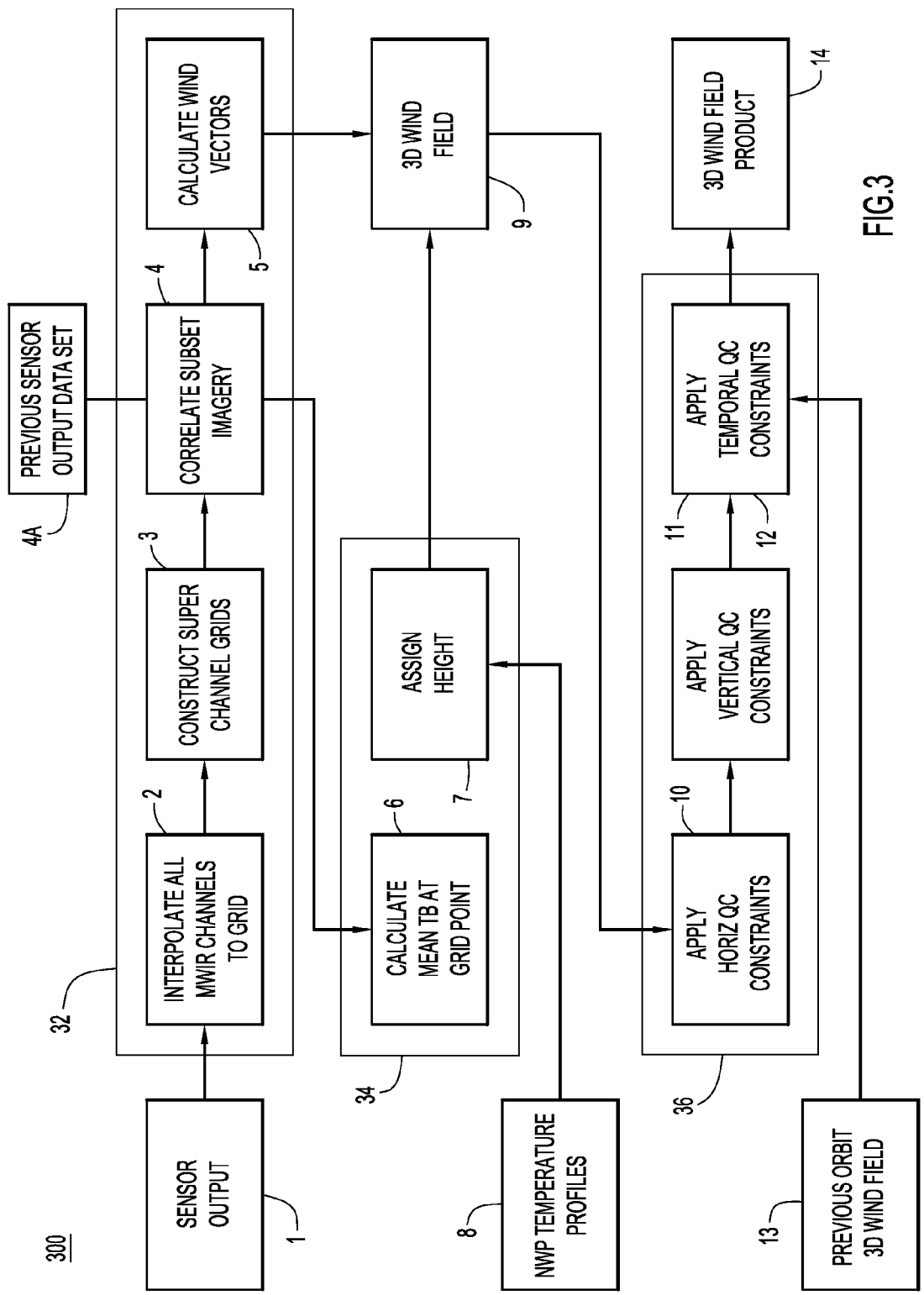
FIG. 3 is a schematic block diagram of functional modules for generating a 3D wind field product in accordance with an embodiment of the invention.

Referring to FIG. 3, a functional block diagram is described to illustrate wind field product generation process 300. The wind field product generation process is described with respect to a plurality of processing segments or stages that for a framework to simplify the description. Briefly, the processing stages of process 300 comprise a wind field determination stage 32, a temperature and height assignment stage 34, and quality control stage 36. Stage 32 comprises processing modules 2-5, which use as an input imaging data records output from a sensor enumerated as block 1. Stage 34 comprises processing modules 6 and 7, which use as an input temperature profiles enumerated as block 8. Stage 36 comprises processing modules 10-12, which use as an input previously estimated wind field data enumerated as block 13. Stages 32 and 34 produce a current wind field enumerated as block 9, while the overall process 300 generates a quality controlled wind field product enumerated as block 14. A processing device configured to execute select modules from process 300 is described in connection with FIG. 7.

Initially, a sensor block 1 provides data generated from a remote sensor or sensors for input into process 300, e.g., SDRs received from satellite 130 (e.g., hyperspectral radiance data from the CrIS instrument) or other remote sensor image data. The sensor output 1 may be converted to brightness temperature spectrum. For example, the converted SDRs may be generated on the satellite 130 or airborne sensor 160, and transmitted to the ground station 150 for further processing.

Once received by ground station 150, the brightness temperature data for each MWIR channel is interpolated to a grid by interpolation module 2. In order to estimate the wind from CrIS measurements using multiple passes of the satellite over the Earth, the data may be interpolated to a Cartesian or other grid.

Super channel grid module 3, decreases the number of observations across the 437 MWIR channels by combining data from multiple channels. In this example, at each grid point of the 437 channels of the CrIS spectrum are combined to form 29 sets of MWIR channels or "super-channels." The selection of which CrIS MWIR channels to combine to form a given super-channel is based on the atmospheric transmission of each channel. In one example, the radiance data from the multiple MWIR channels may be averaged to form the data set for a given super-channel.

A representation of a clear sky transmission spectrum is simulated using an RTM such as the above-described LBL-RTM using atmospheric states derived from numerical weather prediction data (e.g., data from the Global Forecast System produced by the United States National Centers for Environmental Prediction). The height or altitude is calculated for each of the 437 channels from its peak sensitivity, and those values are binned into 500 meter (m) thick atmospheric layers from the surface to the tropopause resulting in 29 layers that correspond to 29 super-channels.

Referring again to FIG. 3, the super-channel grid imagery is used by correlate subset imagery module 4 to extract features in each of the 500 m thick layers and correlate those features in imagery observed at a later time. In order to do so, the data output from a previous or prior sensor pass 4A is used along with the current subset imagery 4. The correlation function may be a sum of squares of the difference of the current image and the next image, e.g., from one satellite pass to the next, or by way of another correlation function.

Figure 4:
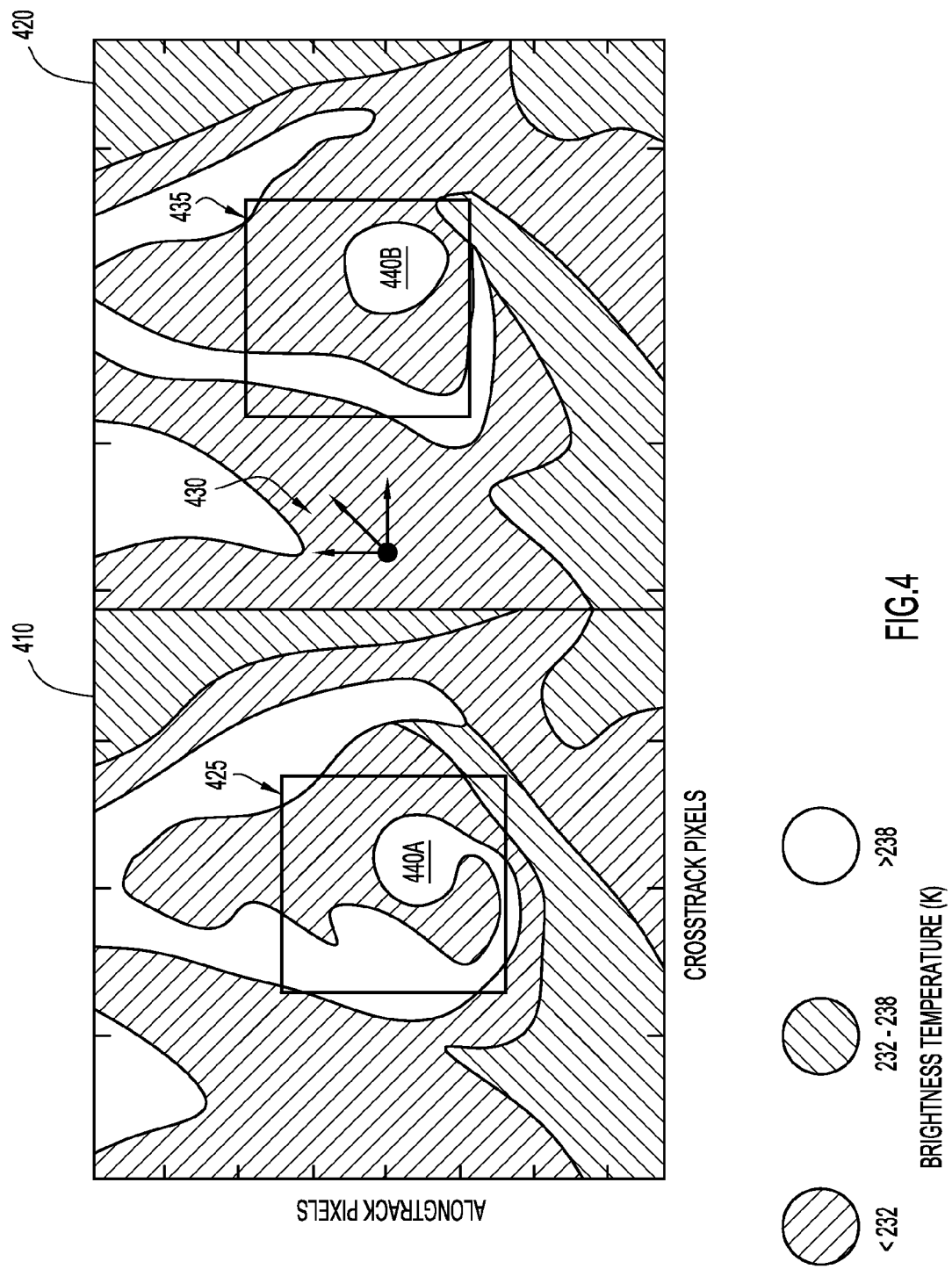
FIG. 4 illustrates motion of a spectral anomaly in accordance with an embodiment of the invention.
Figure 5:
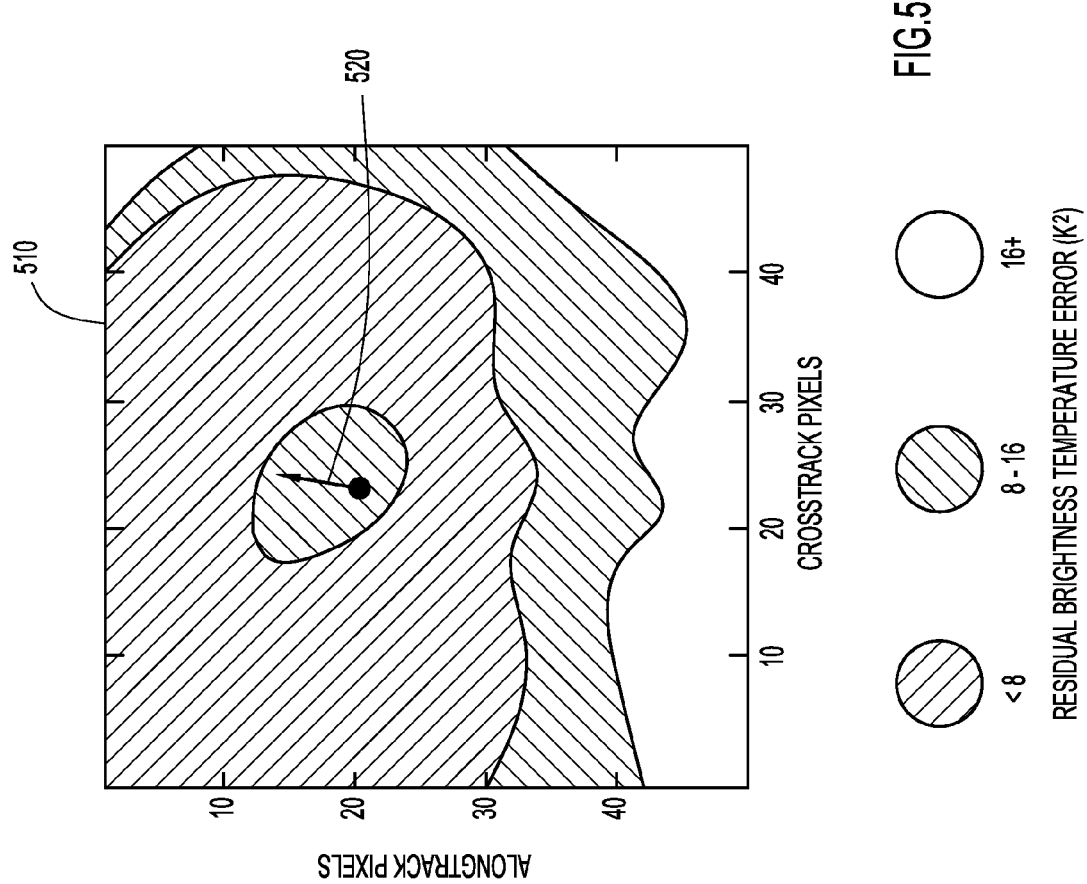
FIG. 5 illustrates motion of a spectral anomaly in accordance with an embodiment of the invention.

The displacement of the feature from one time period to the next time period is used to calculate the wind vector located at the center of the feature at the given height of the predetermined super-channel. An example of a feature observed during successive polar over (satellite) flights is shown in FIG. 4. Temperature data from the first orbit are shown at 410 and data from the second orbit are shown at 420. A square reference box 425 and a square search box 435 are shown. The square search box 435 is moved one pixel at a time, and the mean sum of squares of the imagery difference is calculated at each point between the search box 435 and the reference box 425. When an image feature such as 440A in first pass image data 410 can be correlated with a feature in the second pass image data 420, e.g., feature 440B, a displacement vector can be computed (shown as vector 430). In order to compute the displacement, a minimum residual (e.g., least squares residual of the brightness temperature error) is located as shown in FIG. 5, from which the displacement vector indicated by reference numeral 520 is calculated. The displacement vector in pixels (horizontal and vertical) is converted to distance (in this case one pixel is 14 km on a side). The correlated subset imagery is used to calculate wind vectors module 5 and calculate mean brightness temperature (Tb) at grid point module 6.

In wind vector module 5, the displacement vector 430 and observation times from the subset imagery are used to calculate the wind vector residuals, e.g., as shown at 520 in FIG. 5. In order to do so, the data output from a previous or prior sensor pass 4A (e.g., a sample of prior subset imagery 410 is shown in FIG. 4) is used along with the current subset imagery 4 (e.g., as shown at reference numeral 420 in FIG. 4) to generate 2D wind vectors for a given MWIR channel or super-channel (e.g., 2D vectors like vector 430 or 520). The wind vectors are two dimensional (2D) vectors computed for each 500 m atmospheric layer. The wind vector (arrowhead) may be a simple ratio of displacement distance ($\Delta x/\Delta y$ or $\Delta$ latitude/$\Delta$ longitude) over the difference in time ($\Delta t$) using the displaced vector as distance and the radiance observation time corresponding to the center of the search boxes time difference, e.g., as shown at 430 and 520 in FIGS. 4 and 5, respectively.

In module 6 (FIG. 3), the mean value of the brightness temperature (Tb) inside the search box is calculated for each grid point at which a wind vector is assigned. Assign height module 7 assigns a height to each wind vector using NWP temperature profiles data 8. The NWP temperature profile to estimate the height of the wind vector calculated at that point. By way of example, in module 8, the NWP temperature profile at the current wind field vector point is interpolated to the mean brightness temperature value and the height at the interpolation point is chosen as the wind vector height. It should be understood that the NWP temperature profile correlates temperature to altitude at a point in time.

Figure 6:
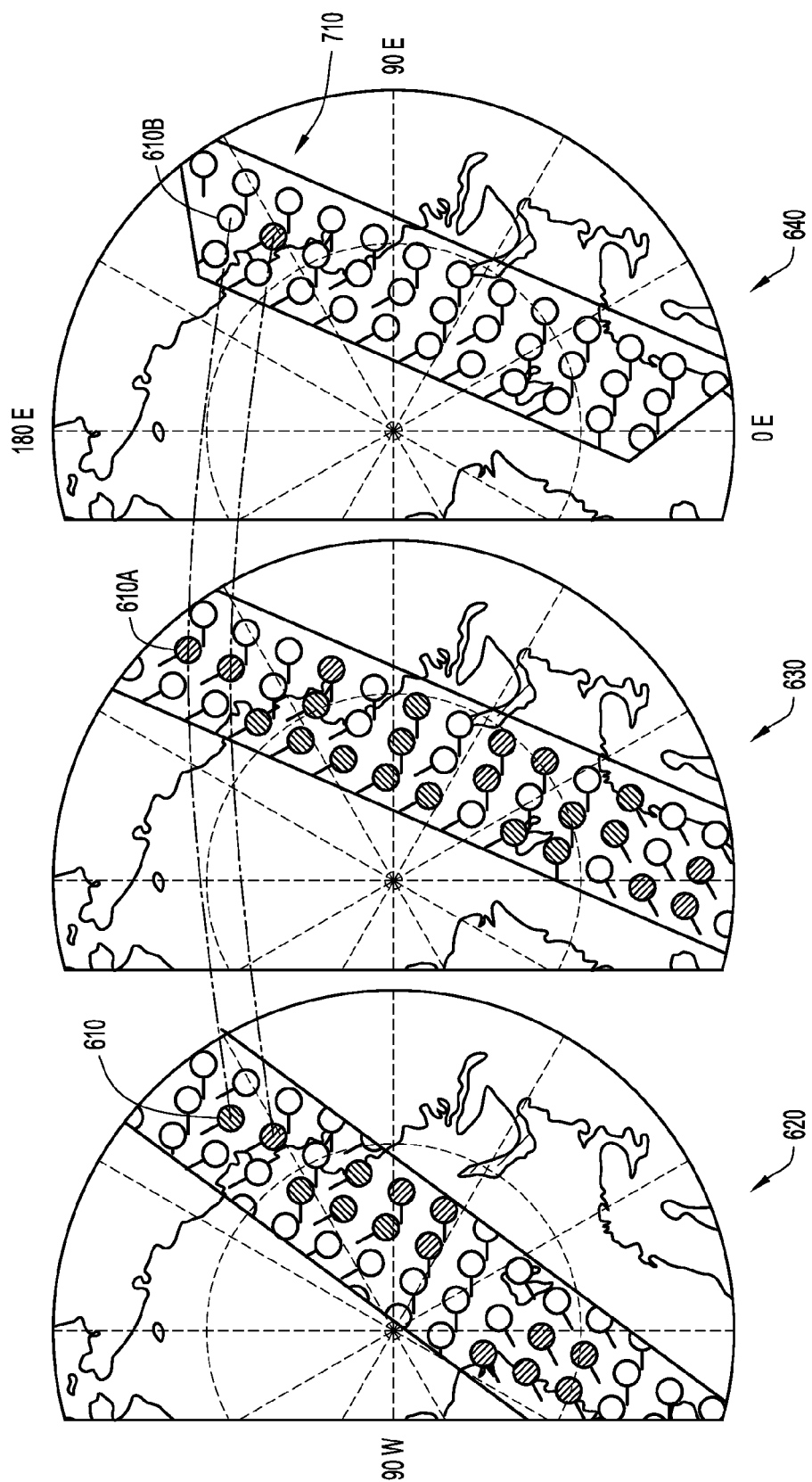
FIG. 6 is a hand drawn version of data decimated from screenshot of a computer generated image that indicates wind temperature for swaths of image data across the Earth's surface obtained by consecutive satellite passes over the Earth.

At this point, the wind vectors from module 5 and altitude or height data from module 7 are processed by wind field generation module 9 (shown as a data output in FIG. 3). The process for data and processing modules 2-6 and 8 is repeated over the entire grid for a given MWIR channel or super-channel, and the resulting product from wind field generation module 9 for is a 2D wind field 710 (e.g., for a single super-channel) is shown in FIG. 6. When processed over the entire 29 super channel grids, a three dimensional (3D) wind field is computed, as described hereinafter. In this example, FIG. 6 depicts wind vectors 710 for a single 2D super channel.

The wind field 710 may be considered an approximation of the actual wind conditions for the given surveillance area. As shown in FIG. 6, each filled circle or "dot" represents a portion of the CrIS sensor's Field of View (FOV). As shown in FIG. 6, a few dozen FOV areas are shown, while in an actual orbital swath of data hundreds or thousands of FOV areas are measured. Accordingly, the size of and spacing between the FOV areas is illustrative, and not to scale. The hashing of a given dot is proportional to the radiance intensity. Each dot has a corresponding attached "tail" or string whose length or magnitude indicates the strength of the wind at that location (e.g., as if the wind were "blowing" a string behind the dot to which the string is attached). As such, the tail also indicates the direction of the wind, but 180 degrees out of phase (e.g., when winds are out of the North, the tail is South of the dot). Quality control (QC) may be applied to the wind field 700 to increase the accuracy of the wind field components to ultimately produce the final wind field product at reference numeral 14 in FIG. 3. Improved accuracy may be achieved by a series of QC modules 10-12 in quality control stage 36.

Quality control improves the wind product since the correlation method, described above, to discern atmospheric features often produces spurious wind vectors, e.g., as shown at reference numeral 620 in FIG. 6 and is described hereinafter. In the example shown in FIG. 6, a first set of 2D wind vectors 620 is generated from a difference in images from a first and a second satellite orbit (i.e., based on the displacements of features from the first orbit's imagery to the second orbit's imagery). A second set of 2D wind vectors 630 is generated from a difference in images from the second satellite orbit and a third satellite orbit. The intersection of 2D wind vectors 620 and 630 is indicated by reference numeral 640. Note visually, that the swath angle between wind vectors 620 and 630 is different and accounts for the satellite's orbital mechanics and the Earth's rotation. Accordingly, the vector intersection 640 crudely represents only those spatial regions that overlap between orbital swaths.

A first of the QC measures is a spatial QC measure obtained via horizontal QC constraints module 10. Horizontal QC constraints module 10 checks spatial/horizontal consistency by comparing the wind speed and direction of every grid point with its nearest neighbors. As used herein, the horizontal plane is the plane that is substantially parallel to the Earth's surface (considering that the Earth's surface is not planar, but has a given curvature). If the wind speed or direction of the current grid point does not agree with its neighbors then the current point is marked as unusable and may be discarded. Spatial inconsistencies in the horizontal plane for image intersection 640 are indicated by circled areas 610, 610A and 610B, which approximately represents the same 2D area.

As shown in FIG. 6, two arcs are connected to satellite FOV areas that approximately represents the same observed 2D area, but may not pass muster by way of quality control stage 36. The upper arc passes through FOV areas 610, 610A and 610B, while the lower arc passes through neighboring FOV areas in wind fields 620, 630 and 640. As viewed in FIG. 6, both the radiative intensity and the wind vectors are largely different between areas 610, 610A and 610B, while the areas connected by the lower arc are consistent. Accordingly, the data points for 610B would be rejected for being spatially inconsistent with data points for areas 610 and 610A, e.g., by horizontal QC constraints module 10. The degree of neighbor compatibility is a system configurable parameter.

Once the spatial or horizontal QC constraints are applied, vertical QC constraint module 11 applies a similar vertical grid point filtering or comparison process with respect to the vertical dimension (e.g., altitude). Next, temporal QC constraint module 12 filters data with respect to the passage of time, e.g., from one satellite pass to another. To provide temporal filtering, module 12 checks a previously observed wind field, e.g., as produced by wind field generation module 9 from a previous satellite orbit. Accordingly, the temporal consistency check compares wind speed and direction from image time to image time using the wind product from the previous orbit.

FIG. 6 shows that temporal consistency removes the spurious winds estimates, e.g., the data points associated with area 610B. In addition to these near-neighbor consistency checks, evaluation of the minimum value of the residual and how "deep" the local well is are also valuable metrics. The final wind product is the result of applying all consistency QC checks from process 300 and provides a 3D wind field for the desired portions of the Earth under observation. Further, prior to launch, the digital image values, e.g., SDRs, provided by the satellite may be compensated with factory tuned calibration factors that account for camera defects and digital conversion (e.g., analog-to-digital (A/D) conversion), and those factors may be referred to generally to produce the relative radiance values.

It should be understood that techniques have been described herein with respect to a single satellite or other reconnaissance vehicle, and that plural sensors may be employed. For example, a constellation of satellites may be employed, e.g., 18 satellites, in any number of orbital planes, to provide wind field products for any desired area of the Earth's atmosphere (or other celestial atmosphere).

Figure 7:
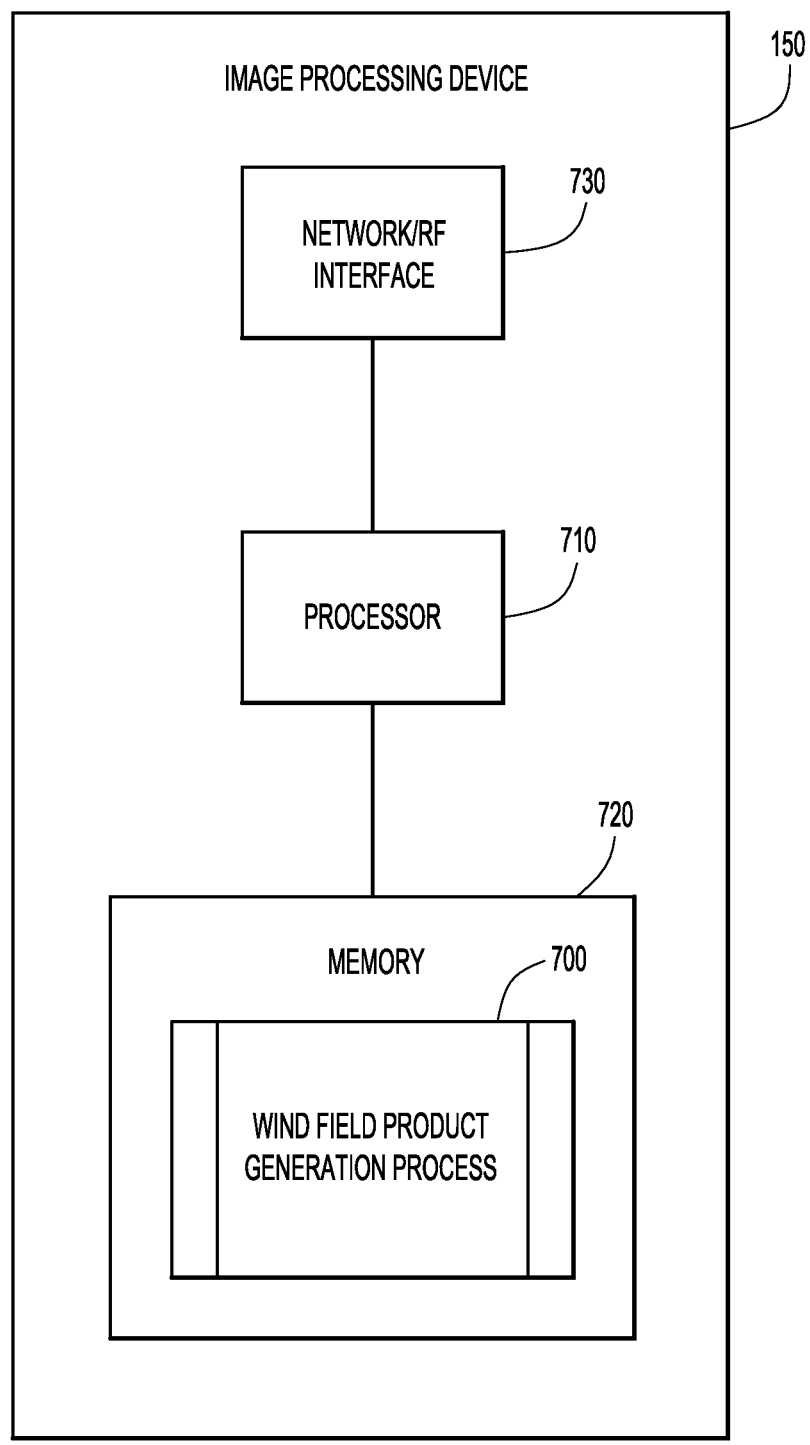
FIG. 7 is a schematic block diagram of an exemplary image processing device in accordance with an embodiment of the invention.

Turning now to FIG. 7, a block diagram of an image processing device 150 is depicted, e.g., ground station 150, which is configured to perform the wind field product generation process 300 described above. The wind field product generation process 300 generally follows the techniques described in connection with FIG. 3 and in connection with FIGS. 4-6. The image processing device 150 comprises a data processing device 310, an interface module 330 and a memory 320. Resident in the memory 320 is software configured to execute wind field product generation process 300. The image processing device 150 and process 300 may also be implemented entirely in software and executed on available commercial off-the-shelf computing equipment.

The data processing device 310 may be a microprocessor, microcontroller, systems on a chip (SOCs), or other fixed or programmable logic. The memory 320 may be any form of random access memory (RAM) or other non-transitory data storage block that stores data used for the techniques described herein. The memory 320 may be separate or part of the processor 310. Instructions for performing the process 300 may be stored in the memory 320 for execution by the processor 310. The interface unit 330 enables communication between the image processing device 150 and other network elements (not shown) and may also include a radio frequency (RF) transceiver interface for communicating with remote sensing equipment, e.g., satellite 130 and remote sensor 160 (FIG. 1). Some or all components of process 300 may be performed aboard the image sensor, e.g., a satellite of reconnaissance vehicle to form a distributed processing environment, when so equipped.

The functions of the processor 310 may be implemented by a processor readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 320 stores data used for the computations or functions described herein (and/or to store software or processor instructions that are executed to carry out the computations or functions described herein). Boot loading instructions for process 300 to a processor, e.g., processor 310, for execution is a known technique and not further explained herein. Thus, the process 300 may be implemented with fixed logic or programmable logic (e.g., software or computer instructions executed by a processor or field programmable gate array (FPGA)).

The techniques provided herein generate a 3D wind field product with a level of granularity of 500 meter layers or better, which is an improvement over existing systems that provided winds, for at most, three atmospheric layers.

Having described preferred embodiments of new and improved methods and apparatus for wind field vertical profile estimation using spectral radiance of multiband imagery and temperature profiles, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus comprising:
  a receiver configured to receive from an image sensor image information comprising image data for a plurality of mid-wave infrared region (MWIR) channels, wherein the image data includes hyperspectral atmospheric radiance indicative of brightness temperatures of the atmosphere, and wherein the image data is obtained during a first imaging period and during a second imaging period temporally different from the first imaging period; and
  at least one processor to generate atmospheric wind fields using the image data and atmospheric temperature profile information, the at least one processor configured to:
    calculate a plurality of sets of atmospheric wind vectors using differences between image data obtained during the first imaging period and the image data obtained during the second imaging period for corresponding sets of MWIR channels;
    assign an altitude to the plurality of atmospheric wind vectors in each set based on a brightness temperature of each wind vector as indicated in the image data and a pre-computed atmospheric temperature profile to generate a set of two-dimensional wind fields comprising one two-dimensional wind field for each set of MWIR channels;
    apply temporal constraints to the set of two-dimensional wind fields using a previously generated set of two-dimensional wind fields to produce a three-dimensional wind field product; and
    apply spatial constraints in the horizontal plane in order to filter out grid point data that do not meet given horizontal spatial constraints.

2. The apparatus of claim 1, wherein the at least one processor is further configured to:
  interpolate atmospheric wind vectors in each set of atmospheric wind vectors to a geographic grid in order to correlate atmospheric wind vectors among each set of atmospheric wind vectors to the geographic grid.

3. The apparatus of claim 2, wherein each set of MWIR channels comprise frequency contiguous sets of MWIR channels in a channel group, and the at least one processor is further configured to:
  combine image data for each channel group to produce a plurality of imagery subsets; and
  correlate imagery subset data combined from image data obtained during the first imaging period with imagery subset data combined from image data obtained during the second imaging period.

4. The apparatus of claim 3, wherein the at least one processor is further configured to:
  calculate the average brightness temperature for image data associated with each channel group at grid points in the geographic grid.

5. The apparatus of claim 1, wherein the at least one processor is further configured to:
  apply vertical constraints in the vertical plane in order to filter out grid point data that do not meet given vertical spatial constraints.

6. A computer implemented method of generating atmospheric wind fields using image data of the atmosphere and atmospheric temperature profile information:
  at an image processing device including memory and a processor coupled to the memory, receiving from an image sensor image information comprising the image data for a plurality of mid-wave infrared region (MWIR) channels, wherein the image data includes hyperspectral atmospheric radiance indicative of brightness temperatures of the atmosphere, and wherein the image data is obtained during a first imaging period and during a second imaging period temporally different from the first imaging period;

calculating a plurality of sets of atmospheric wind vectors using differences between image data obtained during the first imaging period and the image data obtained during the second imaging period for corresponding sets of MWIR channels;

assigning an altitude to the plurality of atmospheric wind vectors in each set based on a brightness temperature of each wind vector as indicated in the image data and a pre-computed atmospheric temperature profile to generate a set of two-dimensional wind fields comprising one two-dimensional wind field for each set of MWIR channels; and calculating an average brightness temperature for image data associated with each channel group at grid points in the geographic grid.

7. The method of claim 6, further comprising:
applying temporal constraints to the set of two-dimensional wind fields using a previously generated set of two-dimensional wind fields to produce a three-dimensional wind field product.

8. The method of claim 7, further comprising:
applying spatial constraints in the horizontal plane in order to filter out grid point data that do not meet given horizontal spatial constraints.

9. The method of claim 7, further comprising:
applying vertical constraints in the vertical plane in order to filter out grid point data that do not meet given vertical spatial constraints.

10. The method of claim 6, further comprising:
interpolating atmospheric wind vectors in each set of atmospheric wind vectors to a geographic grid in order to correlate atmospheric wind vectors among each set of atmospheric wind vectors to the geographic grid.

11. The method of claim 10, wherein each set of MWIR channels comprise frequency contiguous sets of MWIR channels in a channel group, the method further comprising:
combining image data for each channel group to produce a plurality of imagery subsets; and
correlating imagery subset data combined from image data obtained during the first imaging period with imagery subset data combined from image data obtained during the second imaging period.

12. A non-transitory computer readable medium encoded with software comprising processor-executable instructions that, when executed by a processor of an image processing device, cause the processor to generate atmospheric wind fields using image data of the atmosphere and atmospheric temperature profile information by performing the functions of:

receiving from an image sensor image information comprising image data for a plurality of mid-wave infrared region (MWIR) channels, wherein the image data includes hyperspectral atmospheric radiance indicative of brightness temperatures of the atmosphere, and wherein the image data is obtained during a first imaging period and during a second imaging period temporally different from the first imaging period;

calculating a plurality of sets of atmospheric wind vectors using differences between image data obtained during the first imaging period and the image data obtained during the second imaging period for corresponding sets of MWIR channels;

assigning an altitude to the plurality of atmospheric wind vectors in each set based on a brightness temperature of each wind vector as indicated in the image data and a pre-computed atmospheric temperature profile to generate a set of two-dimensional wind fields comprising one two-dimensional wind field for each set of MWIR channels; and interpolating atmospheric wind vectors in each set of atmospheric wind vectors to a geographic grid in order to correlate atmospheric wind vectors among each set of atmospheric wind vectors to the geographic grid.

13. The non-transitory computer readable medium of claim 12, further comprising instructions that, when executed by a processor, cause the processor to perform functions of:
applying temporal constraints to the set of two-dimensional wind fields using a previously generated set of two-dimensional wind fields to produce a three-dimensional wind field product.

14. The non-transitory computer readable medium of claim 12, wherein each set of MWIR channels comprise frequency contiguous sets of MWIR channels in a channel group, and further comprising instructions that, when executed by a processor, cause the processor to perform functions of:
combining image data for each channel group to produce a plurality of imagery subsets; and
correlating imagery subset data combined from image data obtained during the first imaging period with imagery subset data combined from image data obtained during the second imaging period.

15. The non-transitory computer readable medium of claim 13, further comprising instructions that, when executed by a processor, cause the processor to perform functions of:
calculating the average brightness temperature for image data associated with each channel group at grid points in the geographic grid.

16. The non-transitory computer readable medium of claim 13, further comprising instructions that, when executed by a processor, cause the processor to perform one or more functions of:
applying spatial constraints in the horizontal plane in order to filter out grid point data that do not meet given horizontal spatial constraints; and
applying vertical constraints in the vertical plane in order to filter out grid point data that do not meet given vertical spatial constraints.

* * * * *